(12) United States Patent
Ham et al.

(10) Patent No.: US 7,320,721 B2
(45) Date of Patent: Jan. 22, 2008

(54) CHEMICAL FILTER AND FAN FILTER UNIT HAVING THE SAME

(75) Inventors: Dong-Seok Ham, Suwon-si (KR); Hoo-Kun Lee, Daejeon-si (KR)

(73) Assignee: Samsung Electronics Co., Ltd., Suwon, Gyeonggi-do (KR)

( * ) Notice: Subject to any disclaimer, the term of this patent is extended or adjusted under 35 U.S.C. 154(b) by 390 days.

(21) Appl. No.: 11/083,121

(22) Filed: Mar. 17, 2005

(65) Prior Publication Data

US 2006/0207232 A1  Sep. 21, 2006

(51) Int. Cl.
*B01D 46/00* (2006.01)

(52) U.S. Cl. ............... 55/498; 55/385.2; 55/505; 55/471; 55/318; 55/482; 55/510; 96/134; 96/142

(58) Field of Classification Search ............. 55/318, 55/320, 323, 330, 332, 385.2, 482, 486, 487, 55/488, 489, 471, 473, 521, 498, 505, 510; 95/286, 287; 96/134, 135, 142, 153, 154
See application file for complete search history.

(56) References Cited

U.S. PATENT DOCUMENTS

| | | | | |
|---|---|---|---|---|
| 3,498,464 A | * | 3/1970 | Enosolone | 210/457 |
| 4,032,457 A | * | 6/1977 | Matchett | 210/489 |
| 4,130,487 A | * | 12/1978 | Hunter et al. | 210/85 |
| 4,186,099 A | * | 1/1980 | Henschel et al. | 210/457 |
| 4,314,832 A | * | 2/1982 | Fox | 55/482 |
| 4,411,675 A | * | 10/1983 | de Castella | 96/140 |
| 4,477,270 A | * | 10/1984 | Tauch | 96/140 |
| 4,663,041 A | * | 5/1987 | Miyagi et al. | 210/493.2 |
| 5,094,676 A | * | 3/1992 | Karbacher | 96/142 |
| 5,130,023 A | * | 7/1992 | Feint | 210/493.2 |
| 5,167,681 A | | 12/1992 | O'Keefe et al. | |
| 5,288,469 A | * | 2/1994 | Skalla | 422/171 |
| 5,297,990 A | * | 3/1994 | Renz et al. | 454/187 |
| 5,427,597 A | * | 6/1995 | Osendorf | 55/487 |

(Continued)

FOREIGN PATENT DOCUMENTS

JP     6313596     11/1994

(Continued)

*Primary Examiner*—Duane Smith
*Assistant Examiner*—Robert A Clemente
(74) *Attorney, Agent, or Firm*—F. Chau & Associates, LLC (57) ABSTRACT

In a fan filter unit for filtering and continuously supplying clean air into a clean room, the fan filter unit includes a chemical filter for removing chemical contaminants contained in the air, a fan for sucking and blowing out the air, and a particle filter for removing particles such as dusts and moisture contained in the air. A filter medium of the chemical filter has a circular tube shape and is disposed between an inner circular tube and an outer circular tube. A cover is detachably combined with top portions of the inner and the outer circular tubes, and prevents air flow through the top portions of the inner and outer circular tubes. The air is sucked only through the outer circular tube, the chemical filter and the inner circular tube by a suction force of the fan. Accordingly, velocity distribution of the air passing through the chemical filter may be improved and lifetime of the chemical filter may be increased.

16 Claims, 8 Drawing Sheets

U.S. PATENT DOCUMENTS

| | | | |
|---|---|---|---|
| 5,641,343 A * | 6/1997 | Frey | 96/135 |
| 5,904,846 A * | 5/1999 | Clements et al. | 210/321.77 |
| 5,922,095 A * | 7/1999 | Hustvedt et al. | 55/385.1 |
| 5,985,004 A * | 11/1999 | Boyd | 95/241 |
| 6,096,207 A * | 8/2000 | Hoffman et al. | 210/232 |
| 6,120,584 A * | 9/2000 | Sakata et al. | 96/135 |
| 6,146,451 A * | 11/2000 | Sakata et al. | 96/135 |
| 6,152,996 A * | 11/2000 | Linnersten et al. | 96/135 |
| 6,174,342 B1 * | 1/2001 | Jeanseau | 55/385.2 |
| 6,352,578 B1 * | 3/2002 | Sakata et al. | 96/134 |
| 6,361,590 B1 * | 3/2002 | Gilbert et al. | 96/384 |
| 6,368,393 B1 | 4/2002 | Hironaka | |
| 6,375,719 B1 * | 4/2002 | Hustvedt et al. | 95/273 |
| 6,432,177 B1 * | 8/2002 | Dallas et al. | 96/132 |
| 6,569,219 B1 * | 5/2003 | Connor et al. | 55/495 |
| 6,758,876 B2 * | 7/2004 | Suzuki et al. | 55/385.6 |
| 6,866,693 B2 * | 3/2005 | Igarashi | 55/385.3 |
| 2003/0226339 A1 * | 12/2003 | Igarashi | 55/482 |
| 2005/0211619 A1 * | 9/2005 | Bortnik et al. | 210/232 |
| 2006/0123749 A1 * | 6/2006 | Park | 55/428 |

FOREIGN PATENT DOCUMENTS

| | | |
|---|---|---|
| JP | 11090143 | 4/1999 |
| KR | 980009658 | 4/1998 |

* cited by examiner

CHEMICAL FILTER AND FAN FILTER UNIT HAVING THE SAME

BACKGROUND OF THE INVENTION

1. Field of the Invention

The present invention relates to a chemical filter for removing chemical contaminants contained in an air supplied into a clean space and a fan filter unit having the same. More particularly, the present invention relates to a chemical filter for removing chemical contaminants contained in an air supplied into a clean room in which semiconductor device manufacturing processes are carried out, and a fan filter unit having the chemical filter.

2. Description of the Related Art

Semiconductor devices are generally manufactured through several manufacturing processes such as a fabrication process, an electrical die sorting (EDS) process, a packaging process, etc.

In the fabrication process, electronic circuits may be formed on a semiconductor substrate such as a silicon wafer. The EDS process may be carried out for inspecting electrical characteristics of elements and/or semiconductor devices formed on the semiconductor substrate. In the packaging process, the semiconductor devices are separated and packaged with epoxy resin.

In the fabrication process, there are carried out several processes such as a deposition process for forming a layer on the semiconductor substrate, a chemical mechanical polishing (CMP) process for planarizing an upper face of the layer, a photo process for forming a photoresist pattern on the layer, an etching process for forming an electrical pattern using the photoresist pattern, an ion implantation process for implanting predetermined impurities into predetermined portions of the semiconductor substrate, a cleaning process for removing particles from the semiconductor substrate, an inspection process for inspecting defects of the semiconductor substrate on which the layer or the pattern is formed, and/or other processes.

The semiconductor device manufacturing processes are usually performed in a clean space, such as a clean room. A fan filter unit filters continuously supplies a clean air into the clean room in the semiconductor device manufacturing processes. An exemplary conventional fan filter unit for the clean room system is disclosed in U.S. Pat. No. 6,368,393 issued to Hironaka.

Figure 1:
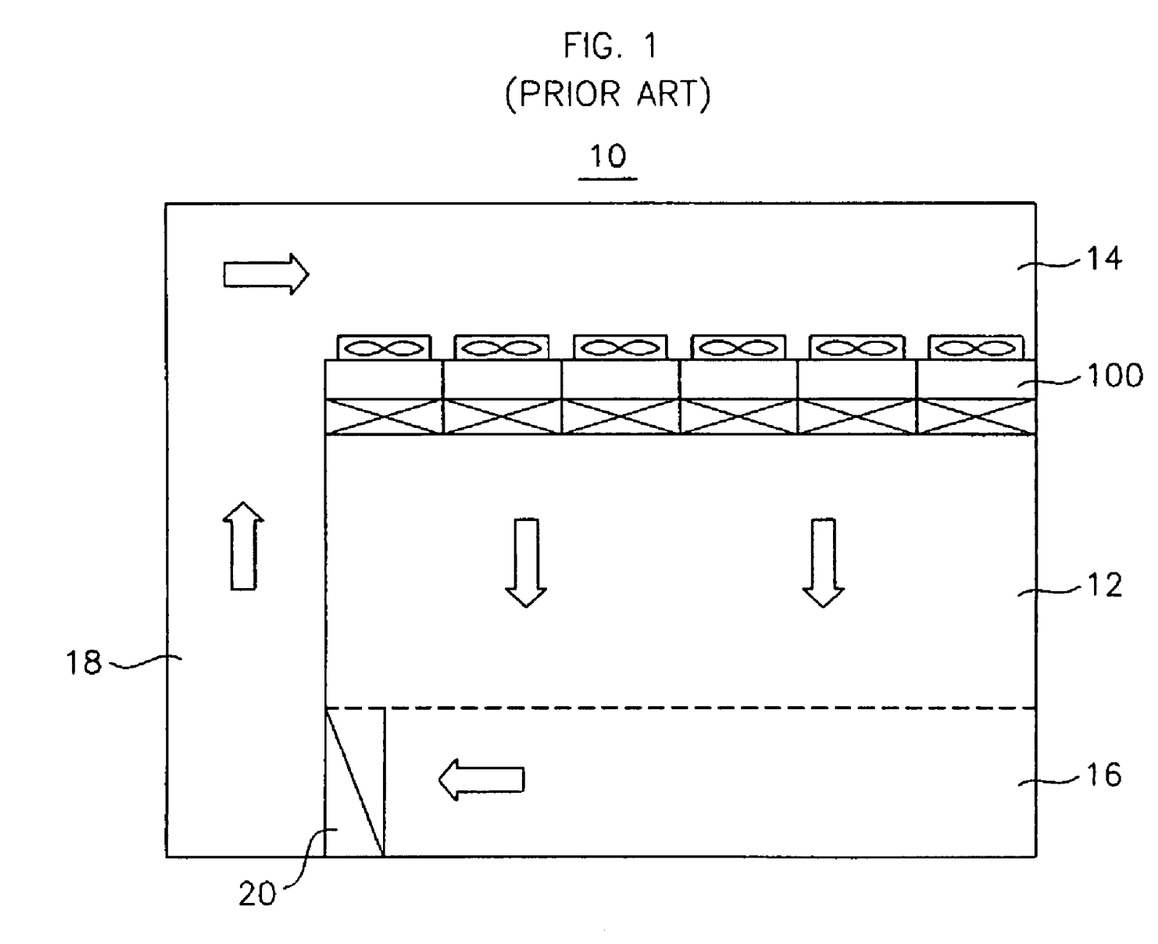
FIG. 1 is a schematic cross-sectional view showing a configuration of a conventional clean room system equipped with fan filter units.
Figure 2:
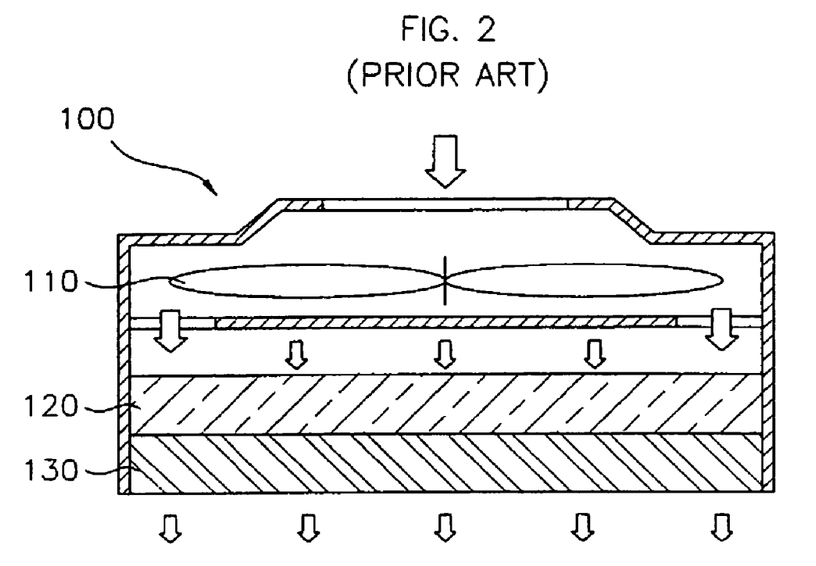
FIG. 2 is a schematic cross-sectional view showing a construction of a conventional fan filter unit.

FIG. 1 is a schematic cross-sectional view showing a configuration of a conventional clean room system equipped with fan filter units, and FIG. 2 is a schematic cross-sectional view showing a structure of a conventional fan filter unit.

Referring to FIG. 1, a clean room system 10 includes a clean room 12, a ceiling chamber 14 defining an upper boundary of an interior of a clean chamber 12, fan filter units 100 arranged in a matrix shape on a ceiling surface of the clean room 12, an underfloor region 16 (or a utility zone) defined under the clean room 12 by floor panels, an air circulation path 18 for connecting the underfloor region 16 with the ceiling chamber 14, and a cooling coil 20 for controlling a temperature of an air circulated through the air circulation path 18.

A clean air supplied into the interior of the clean room 12 by the fan filter units 100 is exhausted to the underfloor region 16, and then is circulated through the air circulation path 18 and the ceiling chamber 14.

Referring to FIG. 2, each of the fan filter units 100 includes a fan 110 for sucking the air from an interior of the ceiling chamber 14, a chemical filter 120 for removing chemical contaminants, such as ammonia ($NH_3$) and ozone ($O_3$), from the air sucked by the fan 110, and a particle filter 130 for removing particles, such as dusts and moisture, from the air chemically filtered by the chemical filter 120.

The chemical filter 120 is disposed between the fan 110 and the particle filter 130 as shown in FIG. 2. This general construction is of the fan filter unit 100 is also disclosed in the above U.S. Pat. No. 6,368,393.

A lifetime of the chemical filter 120 may be dominated by a velocity distribution of the air passing through a filter medium of the chemical filter 120. Because the velocity distribution of the air sucked into a housing of the fan filter unit 100 may varies according to different localities, a utility efficiency of the chemical filter 120 may be deteriorated. Particularly, a velocity of the air passing through an edge portion of the chemical filter 120 is substantially higher than that a central portion of the chemical filter 120 due to the structure of the chemical filter 120, and the lifetime of the chemical filter 120 is effected by the velocity of the air passing through the edge portion of the chemical filter 120. That is, because an air flow rate in the edge portion is greater than that in the central portion, an adsorption rate of the edge portion is substantially higher than that of the central portion so that a contaminant removal efficiency may be deteriorated in the edge portion. Consequently, the lifetime of the chemical filter 120 is dominated by the velocity distribution and the velocity deviation of the air passing through the chemical filter 120 contrary to the particle filter 130.

Thus, there is a need therefore for an improved fan filter unit that allows a uniform velocity distribution of the air passing through the chemical filter.

Figure 3:
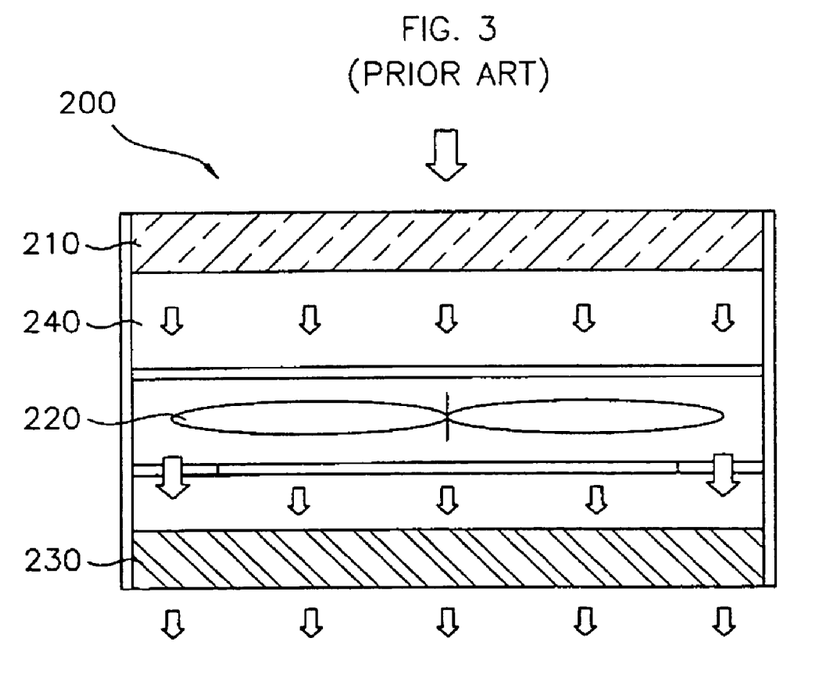
FIG. 3 is a schematic cross-sectional view showing a construction of another conventional fan filter unit.
Figure 4:
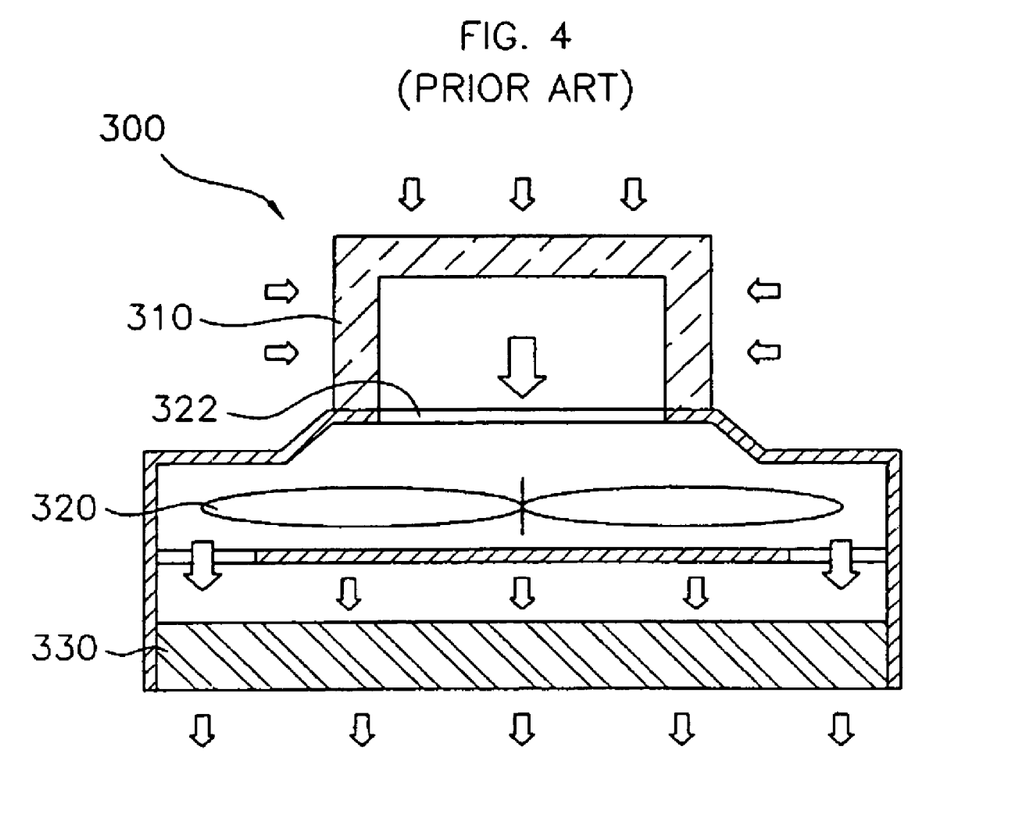
FIG. 4 is a schematic cross-sectional view showing a construction of still another conventional fan filter unit.

Exemplary fan filter units are disclosed in the Japanese Laid Open Patent Publication No. 1999-90143 as shown in FIGS. 3 and 4.

FIG. 3 is a schematic cross-sectional view showing a construction of another conventional fan filter unit, and FIG. 4 is a schematic cross-sectional view showing a construction of still another conventional fan filter unit.

Referring to FIG. 3, a fan filter unit 200 includes a chemical filter 210 for removing chemical contaminants contained in an air of an interior of a ceiling chamber, a particle filter 230 for removing particles from the air chemically filtered by the chemical filter 210, and a fan 220 disposed between the chemical filter 210 and the particle filter 230. A buffer space 240 is provided between the chemical filter 210 and the fan 220 so as to improve a velocity distribution of the air passing through the chemical filter 210.

However, in the fan filter units 100 and 200 as shown in FIGS. 2 and 3, when replacing the chemical filter 120 or 210, the fan filter unit 100 or 200 should be completely dismantled, and consequently time required for replacement work is increased. In addition, the time required may be increased because it is not ease to secure a sufficient working space, and a downtime of the clean room system may be increased because operation of the fan 110 or 220 is interrupted during a replacement work.

Referring to FIG. 4, a chemical filter 310 having a rectangle box shape is connected to an inlet 322 of a fan 320, and a particle filter 330 is connected to an outlet of the fan 320. A fan filter unit 300, as shown in FIG. 4, may shorten the time required for a replacement work of the chemical filter 310. However, there is a problem that a velocity distribution of the air passing through the chemical filter 310 is not uniform because an air velocity difference between an upper portion and side portions of the chemical filter 310.

Particularly, the air velocity in edge portions of the chemical filter 310 is lower than those of flat portions of the chemical filter 310.

SUMMARY OF THE INVENTION

The present invention provides a chemical filter that allows a uniform velocity distribution of an air passing therethrough, The present invention also provides a fan filter unit including the chemical filter that may be easily replaced.

In accordance with one aspect of the present invention, there is provided a chemical filter including an inner circular tube having an air-permeability, an outer circular tube disposed around the inner circular tube, and a filter medium disposed between the inner and the outer circular tubes to remove contaminants contained in an air that flows through the inner and the outer circular tubes. The outer circular tube may also have an air-permeability.

In an exemplary embodiment of the present invention, the chemical filter may include a first cover removably coupled to top portions of the inner and the outer circular tubes to thereby prevent an air flow through the top portions of the inner and the outer circular tubes, and a second cover detachably attached to bottom portions of the inner and the outer circular tubes. An inner space of the inner circular tube, and an inter-space between the inner and the outer circular tubes may be defined by the first and the second covers. The first cover may have a disc shape and the second cover may have a circular flat ring shape that includes an opening in communication with the inner space of the inner circular tube. The opening may serve as an outlet of the chemical filter.

In accordance with another aspect of the present invention, there is provided a fan filter unit including a chemical filter, a fan and a particle filter. The chemical filter may include an inner circular tube having an air-permeability, an outer circular tube disposed around the inner circular tube wherein the outer circular tube has an air-permeability, and a filter medium disposed between the inner and the outer circular tubes to remove contaminants contained in an air that flows through the inner and the outer circular tubes. The fan is disposed in communication with an inner space of the inner circular tube to suck the air through the outer circular tube, the filter medium and the inner circular tube. The particle filter is connected to the fan to remove particles contained in the air blown out by the fan.

In an exemplary embodiment of the present invention, the air, for example, an interior air of ceiling chamber on a clean room, may be sucked into an inner space of the inner circular tube by suction force provided from the fan. The suction force may be provided along a central axis of the inner circular tube, and the inner space of the inner circular tube and an inter-space between the inner and the outer circular tubes may be defined by a first cover removably combined with top portions of the inner and outer circular tubes. Thus, the air may be sucked only through the outer circular tube, the chemical filter and the inner circular tube by the suction force. The inner circular tube may be coaxially arranged within the outer circular tube, and the chemical filter may be coaxially arranged with the fan. Thus, the suction force may be uniformly applied to the inner circular tube, and a velocity distribution of the air passing through the filter medium may be improved. Accordingly, a lifetime of the chemical filter may be increased. In addition, a time required for a replacement work of the chemical filter may be shortened because the chemical filter has a substantially cylindrical shape and is connected to an upper inlet of the fan.

In accordance with still another aspect of the present invention, there is provided a fan filter unit including a fan, a chemical filter and a particle filter. The fan is provided to suck an air from an interior of a ceiling chamber defining an upper boundary of an interior of a clean chamber and to blow out the air into the interior of the clean room. The fan has an upper inlet for sucking the air and a lower outlet for blowing out the air. The chemical filter is disposed on a top portion of the fan. The chemical filter includes a filter medium for removing chemical contaminants contained in the air being flown into the interior of the clean room, the filter medium having a substantially circular tube shape, an inner circular tube disposed in the filter medium, the inner circular tube having an air-permeability, and an outer circular tube disposed around the filter medium, the outer circular tube having an air-permeability, and a cover removably attached to top portions of the inner and outer circular tubes to prevent an air flow through the top portions of the inner and outer circular tubes into spaces defined by the inner and the outer circular tubes. The upper inlet of the fan is in communication with an inner space of the inner circular tube, and the air is flown only through the outer circular tube, the filter medium and the inner circular tube into the inner space of the inner circular tube. The particle filter is connected to a lower portion of the fan to remove particles contained in the air blown out by the fan.

BRIEF DESCRIPTION OF THE DRAWINGS

The above and other features and advantages of the present invention will become readily apparent by reference to the following detailed description when considered in conjunction with the accompanying drawings wherein.

DESCRIPTION OF THE EMBODIMENTS

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that when an element is referred to as being "on" another element, it can be directly on the other element or intervening elements may be present. In contrast, when an element is referred to as being "directly on" another element, there are no intervening elements present. As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another. The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, relative terms, such as "lower" or "bottom" and "upper" or "top," may be used herein to describe one element's relationship to another elements as illustrated in the Figures.

It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms; such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated, typically, may be rounded. Thus, the regions illustrated in the figures are schematic in nature and their shapes are not intended to illustrate the precise shape of a region and are not intended to limit the scope of the present invention.

Figure 5:
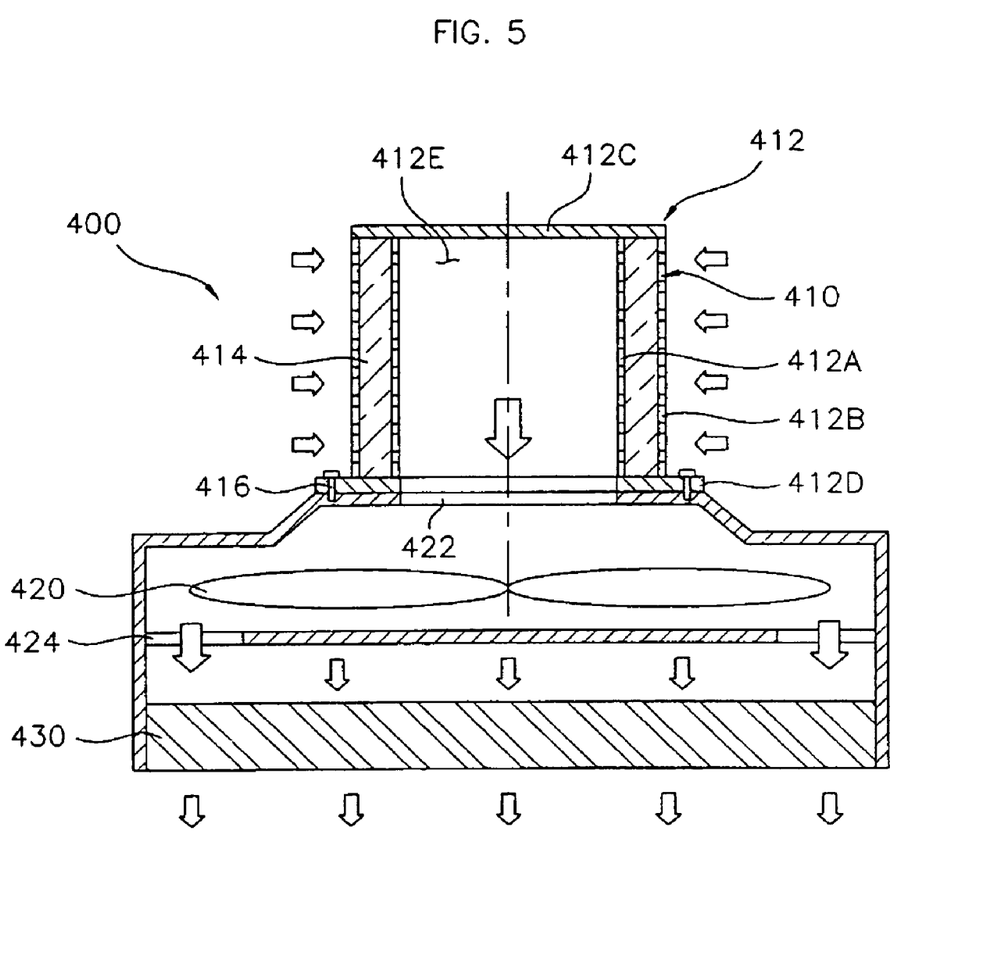
FIG. 5 is a schematic cross-sectional view showing a fan filter unit having a chemical filter according to an exemplary embodiment of the present invention.

FIG. 5 is a schematic cross-sectional view showing a fan filter unit having a chemical filter according to an exemplary embodiment of the present invention.

Referring to FIG. 5, a fan filter unit 400 is installed on a ceiling of a clean room in which semiconductor device manufacturing processes are performed in order to supply a clean air into the clean room.

The fan filter unit 400 includes a chemical filter 410 for removing chemical contaminants contained in the air supplied into the clean room, a fan 420 for providing a suction force in order to suck the air, and a particle filter 430 for removing particles, such as dusts and moisture, contained in the air chemically filtered by the chemical filter 410.

The fan filter unit 400 is employed for purifying a circulating air in a clean room system 10 that includes a clean room 12, a ceiling chamber 14, an underfloor region 16, an air circulation path 18 and a cooling coil 20 as substantially shown in FIG. 1.

The chemical filter 410 is used for removing the chemical contaminants, such as ammonia, ozone or the like, contained in the circulating air. The chemical filter 410 has a cylindrical housing 412 for receiving a filter medium 414. The housing 412 includes an inner circular tube 412A, an outer circular tube 412B, a first cover 412C and a second cover 412D.

The inner and the outer circular tubes 412A and 412B may permeate the air therethrough. The inner circular tube 412A is coaxially arranged within the outer circular tube 412B. The first cover 412C is detachably attached to top portions of the inner and the outer tubes 412A and 412B, and the second cover 412D is detachably attached to bottom portions of the inner and the outer tubes 412A and 412B. An inner space 412E of the inner circular tube 412A and an inter-space 412F (see FIG. 6) between the inner and the outer circular tubes 412A and 412B are defined by the first and the second covers 412C and 412D.

The first cover 412C may have a disc shape, and the second cover 412D may have a circular flat ring shape including an opening 412G in communication with the inner space 412E of the inner circular tube 412A. The first cover 412C is used for preventing an air flow through the top portions of the inner and the outer circular tubes 412A and 412B, and the second cover 412D is used for preventing an air flow through the bottom portions of the inner and the outer tubes 412A and 412B. That is, the first and the second covers 412C and 412C are used for preventing the air from being introduced into the inner space 412E and the inter-space 412F through the top and bottom portions of the tubes 412A and 412B. The opening 412G of the second cover 412D may be used as an outlet of the chemical filter 410.

The fan 420 has an upper inlet 422 and a lower outlet 424. The second cover 412D is interposed between the bottom portions of the inner and the outer circular tubes 412A and 412B and the fan 420 so as to surround the upper inlet 422 of the fan 420. That is, the second cover 412D is disposed on a peripheral portion of the upper inlet 422 so that the inner space 412E of the inner circular tube 412A and the opening 412G of the second cover 412D are in communication with the upper inlet 422 of the fan 420.

The second cover 412D has an outer diameter substantially larger than that of the outer circular tube 412B. A plurality of holes 412H is circumferentially formed through edge portions of the second cover 412D, and the chemical filter 410 is connected to an upper portion of the fan 420 by a plurality of fasteners 416 secured to the upper portion of the fan 420 through the holes 412H. Further, the second cover 412D has an inner diameter substantially equal to or smaller than that of the inner circular tube 412A.

Figure 6:
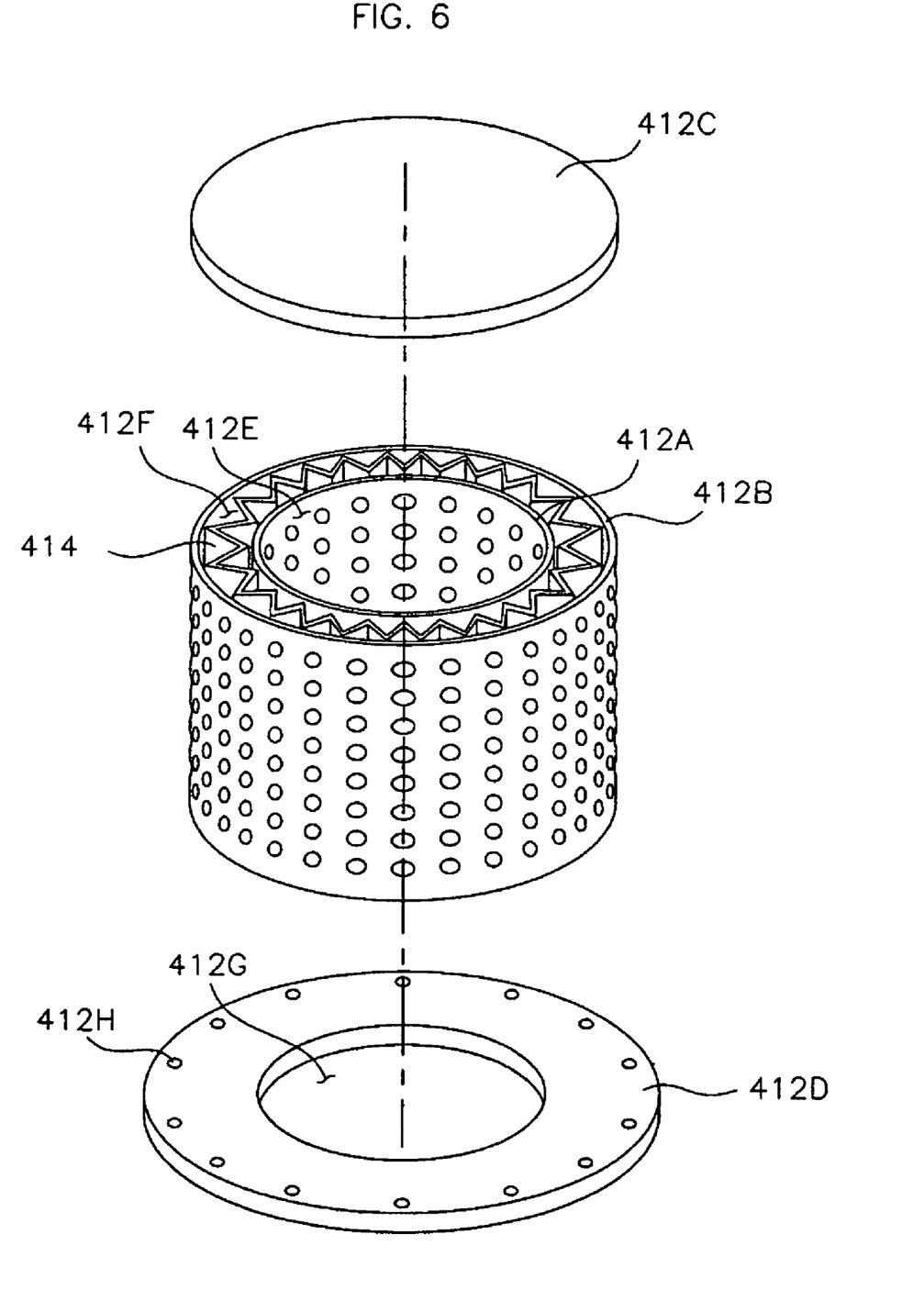
FIG. 6 is a perspective view showing the chemical filter in FIG. 5.

The inner and the outer circular tubes 412A and 412B are an air-permeable. In particular, the inner and the outer circular tubes 412A and 412B may include perforated metal sheets through which a plurality of holes is formed, porous metal sheets, metal meshes, or the like, respectively. For example, the inner and the outer circular tubes 412A and 412B may be formed using perforated aluminum sheets or aluminum meshes, respectively. As shown in FIG. 6, though the inner and the outer circular tubes 412A and 412B have a plurality of circular holes, dimensions or structures of the holes may vary.

The chemical filter 410 is coaxially arranged with the fan 420 so as to maintain an even distance between a central axis of the fan 420 and the inner circular tube 412A. Thus, the suction force provided from the fan 420 may be uniformly applied to the inner circular tube 412A of the chemical filter 410, and a velocity distribution of the air passing through the filter medium 414 may be improved.

The fan 420 provides the suction force for sucking the air, that is, the interior air of the ceiling chamber, along a central axis of the chemical filter 410, the air is sucked into the inner space 412E of the inner circular tube 412A through the outer circular tube 412B, the filter medium 414 and the inner circular tube 412A.

As shown in FIG. 6, a pleat type filter medium may be used as the filter medium 414. The filter medium 414 may have a circular tube shape and is received into the interspace 412F between the inner and the outer circular tubes 412A and 412B.

The air chemically filtered by the chemical filter 410 is introduced into the particle filter 430 via a space in communication with the lower outlet 424, and the particles contained in the air may be removed by the particle filter 430.

The velocity distribution of the air passing through the chemical filter 410 having the cylindrical shape with the first cover 412C, as described above, is remarkably improved in comparison with the conventional chemical filters 120, 210 and 310 in FIGS. 2 to 4. Thus, a lifetime and a utility efficiency of the chemical filter 410 may be improved. In addition, the chemical filter 410 is disposed on the upper inlet of the fan, and thus a replacement work of the chemical filter 410 may be easily performed. Also, a time required for the replacement work may be shortened. Furthermore, a cost required for the replacement work may be reduced because only the filter medium 414 may be replaced after removing the first cover 412C.

Table 1 shows a velocity distribution of the air passing through the conventional chemical filter 120 in the conventional fan filter unit 100 in FIG. 2. The velocity measurement was performed at 36 measurement points, and the conventional chemical filter had a rectangular plate shape that had a dimension of about 1200 mm×about 1200 mm. The measured velocity distribution was varied in range of about 0.31 m/s to about 0.54 m/s, and the velocity deviation was about ±24%.

TABLE 1

| Measurement position | X1 | X2 | X3 | X4 | X5 | X6 |
|---|---|---|---|---|---|---|
| Y1 | 0.46 | 0.31 | 0.41 | 0.35 | 0.44 | 0.44 |
| Y2 | 0.44 | 0.38 | 0.41 | 0.35 | 0.38 | 0.37 |
| Y3 | 0.41 | 0.47 | 0.49 | 0.39 | 0.49 | 0.46 |
| Y4 | 0.37 | 0.39 | 0.40 | 0.41 | 0.41 | 0.41 |
| Y5 | 0.37 | 0.37 | 0.37 | 0.36 | 0.33 | 0.36 |
| Y6 | 0.54 | 0.39 | 0.38 | 0.40 | 0.40 | 0.44 |

In the convention fan filter unit 200 having the buffer space 240 in FIG. 3, the chemical filter 210 had a rectangular plate shape having a dimension of about 1200 mm×about 1200 mm. The velocity distribution of the air passing through the chemical filter 210 was varied in range of about 0.38 m/s to about 0.48 m/s, and the velocity deviation was about ±12%.

Figure 7:
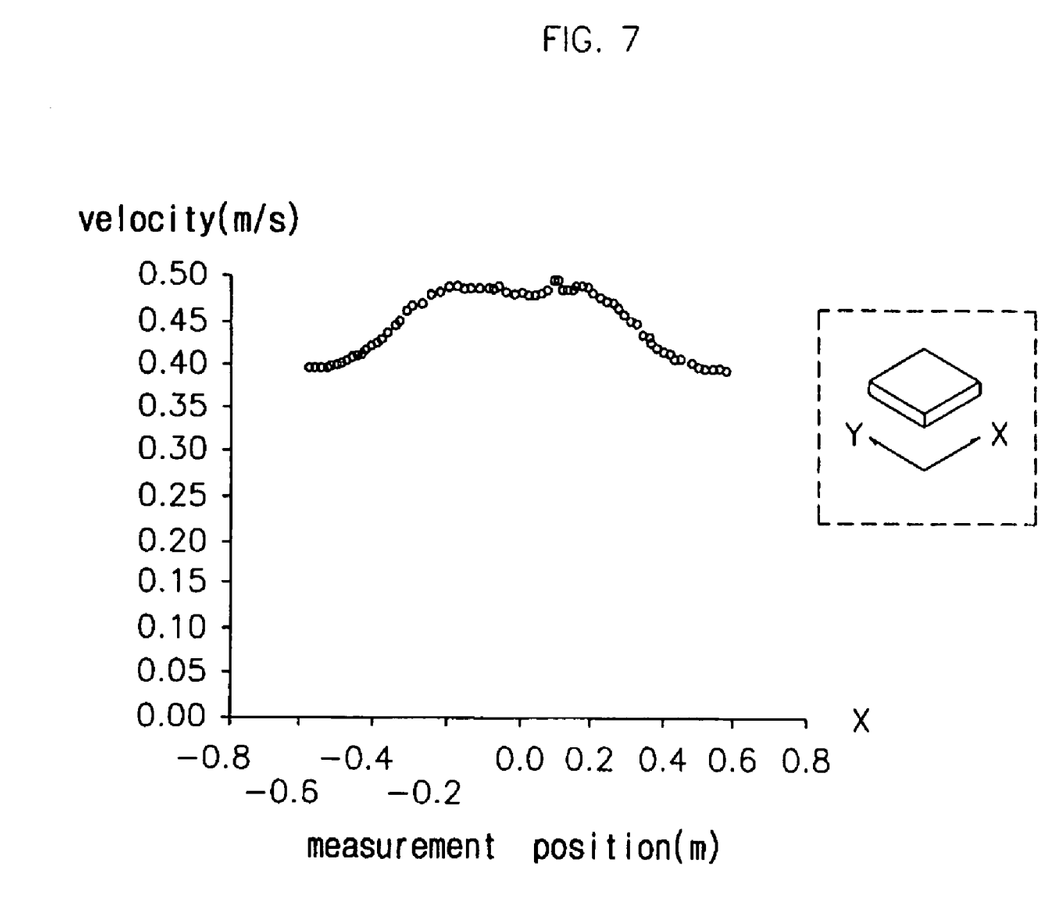
FIG. 7 is a graph illustrating a velocity distribution of an air passing through the conventional chemical filter in FIG. 3.

FIG. 7 is a graph showing the velocity distribution of the air passing through the conventional chemical filter 210 in FIG. 3 using an X-axis coordinate.

Referring to FIG. 7, the air velocity was gradually reduced in a light direction and a left direction from a zero (0.0) point in the X-axis coordinate. This indicates that the velocity of the air passing through a central portion of the chemical filter 210 is substantially faster than the velocity of the air passing through an edge portion of the chemical filter 210, and the air velocity distribution is not uniform in the x-axis direction.

Figure 8:
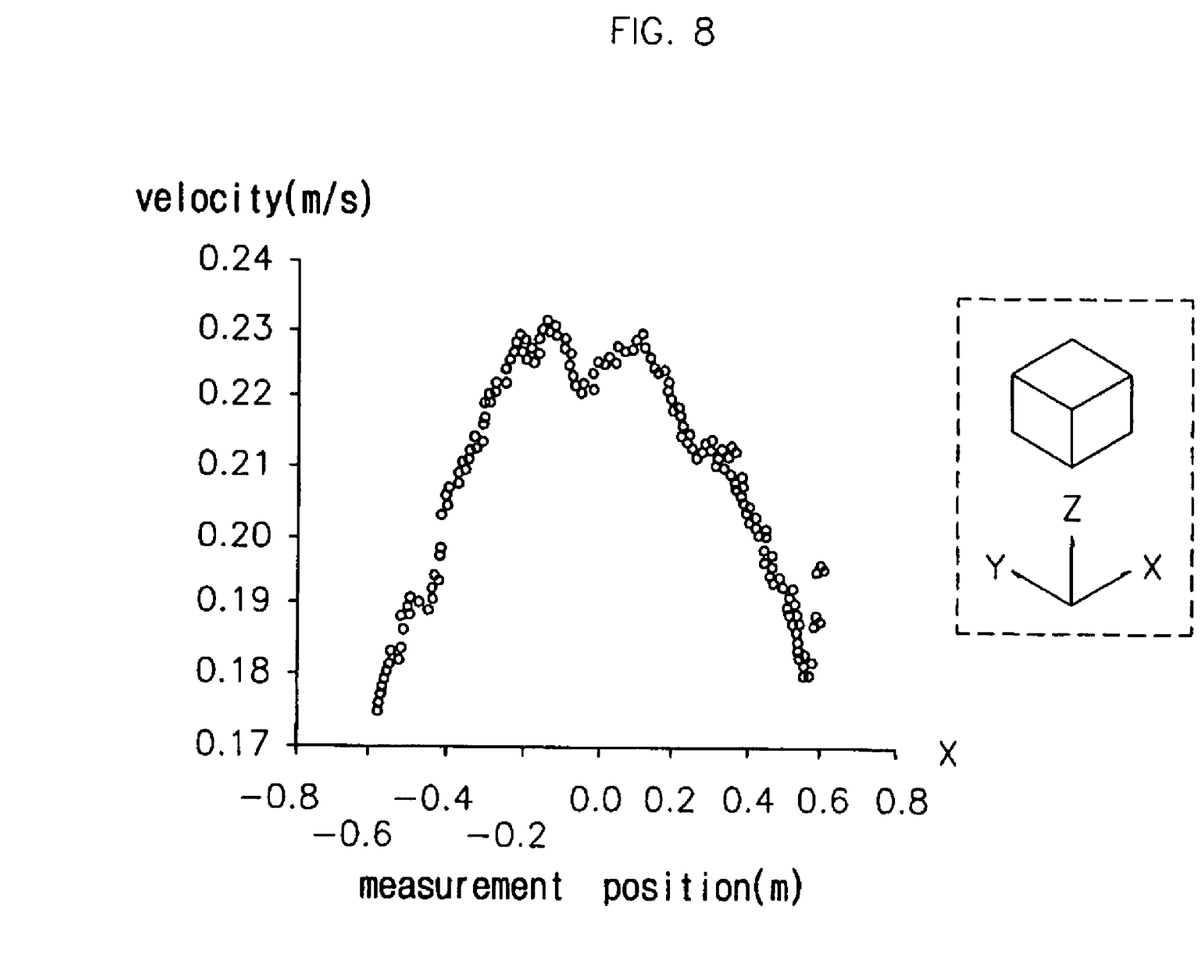
FIG. 8 is a graph illustrating a velocity distribution of an air passing through a side portion of the conventional chemical filter in FIG. 4.

In the convention fan filter unit 300 equipped with the chemical filter 310 having a rectangular box shape as shown in FIG. 4, the velocity distribution was measured as shown in FIG. 8 and Tables 2 and 3.

FIG. 8 is a graph showing a velocity distribution of the air passing through the side portion of the conventional chemical filter 310 in FIG. 4 using an X-axis coordinate.

Referring to FIG. 8, it was observed that the velocity distribution of the air passing through the side portion of the convention chemical filter 310 is not uniform; The non-uniformity as stated above is caused by an air stream through the upper portion of the chemical filter 310, and a distance difference from a central axis of the fan 320 to the side portion of the chemical filter 310.

Table 2 shows the air velocity distribution at an upper portion of the chemical filter 310, and Table 3 shows the air velocity distribution at a lateral portion of the chemical filter 310.

TABLE 2

| Measurement position | X1 | X2 | X3 | X4 |
|---|---|---|---|---|
| Y1 | 0.39 | 0.45 | 0.49 | 0.40 |
| Y2 | 0.37 | 0.41 | 0.50 | 0.43 |
| Y3 | 0.40 | 0.42 | 0.46 | 0.40 |
| Y4 | 0.39 | 0.44 | 0.46 | 0.38 |

TABLE 3

| Measurement position | X1 | X2 | X3 | X4 |
|---|---|---|---|---|
| Z1 | 0.17 | 0.21 | 0.22 | 0.21 |
| Z2 | 0.18 | 0.19 | 0.23 | 0.20 |
| Z3 | 0.19 | 0.23 | 0.23 | 0.19 |
| Z4 | 0.20 | 0.21 | 0.20 | 0.16 |

Referring to Tables 2 and 3, the air velocity distribution at the upper portion of the chemical filter 310 was quite different from the air velocity distribution at the lateral portion of the chemical filter 310. The air velocity distribution at the upper portion was varied in range of about 0.37 m/s to about 0.5 m/s, but on the other hand, the air velocity distribution in the side portion was varied in range of about 0.14 m/s to about 0.23 m/s. In addition, the velocity deviation in the upper portion was about ±15%, whereas the velocity deviation at the lateral portion was about ±35%.

The air velocity distribution at the upper portion was similar to the air velocity distribution in the chemical filter 210 of the fan filter unit 200 having the buffer space 240. However, the air velocity distribution at the lateral portion was measured lower than the air velocity distribution at the upper portion, and the air velocity was measured particular lower at the edge portions. Particularly, the air velocity at the upper portion was substantially twice greater than the air velocity at the lateral portion, and the ratio of the maximum air velocity at the upper portion to the minimum air velocity at the lateral portion was about 2.9 to about 1. Thus, a utility efficiency of the chemical filter 310 is deteriorated, and a lifetime of the chemical filter 310 may be greatly effected by the air velocity in the upper portion.

Figure 9:
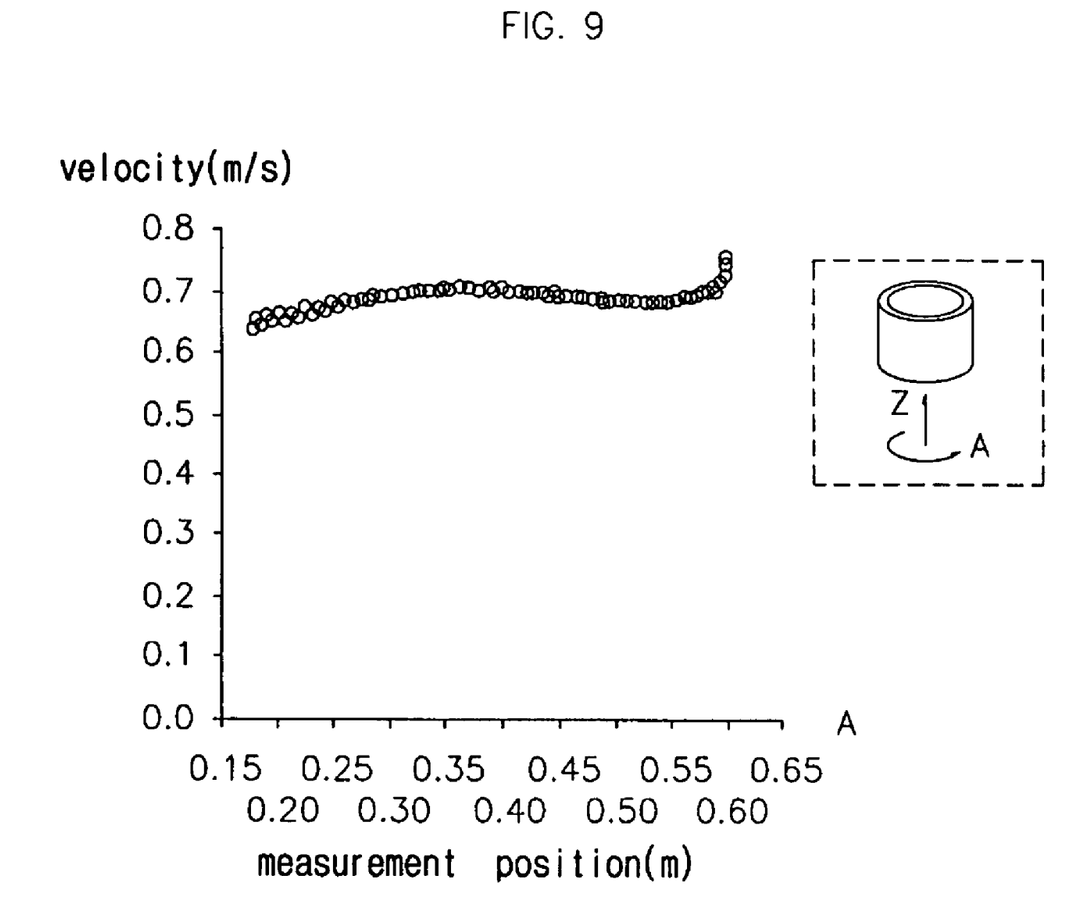
FIG. 9 is a graph illustrating a velocity distribution of an air passing through the chemical filter in FIG. 5.

On the contrary, in the fan filter unit 400 of the exemplary embodiment of the present invention as shown in FIG. 5, the velocity distribution of the air passing through the cylindrical chemical filter 410 was measure as shown in Table 4, and the velocity distribution in a circumferential direction was uniformly measured as shown in FIG. 9.

TABLE 4

| Measurement position | A1 | A2 | A3 | A4 |
|---|---|---|---|---|
| Z1 | 0.6 | 0.58 | 0.6 | 0.55 |
| Z2 | 0.62 | 0.58 | 0.57 | 0.54 |
| Z3 | 0.6 | 0.53 | 0.57 | 0.53 |
| Z4 | 0.61 | 0.52 | 0.54 | 0.53 |

Referring to FIG. 9 and Table 4, the air velocity distribution in the chemical filter 410 was varied in range of about 0.53 m/s to about 0.62 m/s, and the velocity deviation was about ±7%.

As described above, it is observed that the chemical filter 410 according to the exemplary embodiment of the present invention has an improved velocity distribution in comparison with the conventional chemical filters 120, 210 and 310. In addition, it is observed that the chemical filter 410 has an extended lifetime in comparison with the conventional chemical filters 120, 210 and 310.

The lifetime of the cylindrical shape chemical filter 410 may be really extended about 10% to about 20% in comparison with the conventional chemical filter 120 and 210 having the rectangular plate shape. In addition, the cylindrical shape chemical filter 410 may reduce a manufacturing cost by about 10% to about 20%.

Meanwhile, the chemical filter 120 in FIG. 2 has a contamination removal efficiency of about 94.3% regarding the contaminants, such as ammonia, whereas the cylindrical shape chemical filter 410 has a contamination removal efficiency of about 95.9%. In particular, when filtering the air having contamination level of about 28.5 ppb using the chemical filter 120, a contamination level of the filtered air was about 1.71 ppb, and a pressure drop was about 2.2 mmAq. On the contrary, when filtering the air having contamination level of about 30.6 ppb, a contamination level of the filter air was about 1.24 ppb, and a pressure drop was about 1.7 mmAq.

According to the present invention, the cylindrical shape chemical filter sucks the air in a direction substantially perpendicular to a central axis of the fan, and consequently has an improved air velocity distribution. Additionally, a lifetime of the chemical filter may be extended, and also a utility efficiency of the chemical filter may be improved. Furthermore, the cylindrical-shaped chemical filter is connected onto the upper inlet of the fan. Thus, the replacement work of the chemical filter may be easily performed, and a time required for a replacement work may be shortened. As a result, a cost required for the replacement work may be reduced because only the filter medium may be replaced after removing the first cover.

Having thus described exemplary embodiments of the present invention, it is to be understood that the invention defined by the appended claims is not to be limited by particular details set forth in the above description as many apparent variations thereof are possible without departing from the spirit or scope thereof as hereinafter claimed.

What is claimed is:

1. A chemical filter comprising:
an inner circular tube having an air-permeability;
an outer circular tube disposed around the inner circular tube, the outer circular tube having an air-permeability;
a filter medium disposed between the inner and the outer circular tubes to remove contaminants contained in an air flow through the inner and the outer circular tubes; and
a first cover detachably attached to top portions of the inner and the outer circular tubes to prevent an air flow through a top portion of the chemical filter; and
a second cover detachably attached to bottom portions of the inner and the outer circular tubes, wherein an inner space of the inner circular tube and an inter-space between the inner and the outer circular tubes are defined by the first and the second covers, and wherein the second cover has a circular flat ring shape, an outer diameter of the second cover is substantially larger than that of the outer circular tube, outer edge portions of the second cover having an attachment means for coupling the chemical filter.

2. The chemical filter of claim 1, wherein the first cover has a disc shape and the second cover including an opening in communication with the inner space of the inner circular tube.

3. The chemical filter of claim 1, wherein the inner circular tube is coaxially arranged within the outer circular tube.

4. The chemical filter of claim 1, wherein the inner and the outer circular tubes comprise perforated metal sheets, respectively.

5. The chemical filter of claim 1, wherein the inner and the outer circular tubes comprises metal meshes, respectively.

6. A fan filter unit comprising:
a chemical filter including an inner circular tube having an air-permeability, an outer circular tube disposed around the inner circular tube, the outer circular tube having an air-permeability, and a filter medium disposed between the inner and the outer circular tubes to remove contaminants contained in an air flow through the inner and the outer circular tubes;
a fan disposed in communication with an inner space of the inner circular tube to suck the air passing through the outer circular tube, the filter medium and the inner circular tube;
a particle filter connected to the fan to remove particles contained in the air blown out by the fan, and
a second cover disposed between the chemical filter and the fan to surround an upper inlet of the fan, wherein the inner space of the inner circular tube, and an inter-space between the inner and the outer circular tubes are defined by the first and the second covers, wherein the second cover has a circular flat ring shape, an outer diameter of the second cover is substantially larger than that of the outer circular tube, and the chemical filter is connected onto the upper portion of the fan by a plurality of fasteners secured to the upper portion of the fan through edge portions of the second cover.

7. The fan filter unit of claim 6, further comprising a first cover detachably attached to top portions of the inner and the outer circular tubes to prevent an air flow through the top portions of the inner and the outer circular tubes.

8. The fan filter unit of claim 6, wherein the first cover has a disc shape and the second cover including an opening in communication with the inner space of the inner circular tube.

9. The fan filter unit of claim 6, wherein the inner circular tube is coaxially arranged within the outer circular tube.

10. The fan filter unit of claim 6, wherein the chemical filter is coaxially arranged with the fan.

11. The fan filter unit of claim 6, wherein the inner and the outer circular tubes comprise perforated metal sheets, respectively.

12. The fan filter unit of claim 6, wherein the inner and the outer circular tubes comprise metal meshes, respectively.

13. A fan filter unit comprising:
   a fan for sucking an air from an interior of a ceiling chamber defining an upper boundary of an interior of a clean chamber and blowing out the air into the interior of the clean room, the fan having an upper inlet for sucking the air and a lower outlet for blowing out the air;
   a chemical filter disposed on a top portion of the fan, the chemical filter including a filter medium for removing chemical contaminants contained in the air being flown into the interior of the clean room, the filter medium having a circular tube shape as a whole, an inner circular tube disposed in the filter medium, the inner circular tube having an air-permeability, and an outer circular tube disposed around the filter medium, the outer circular tube having an air-permeability, and a first cover detachably coupled to top portions of the inner and the outer circular tubes to prevent an air flow through the top portions of the inner and the outer circular tubes into spaces defined by the inner and the outer circular tubes, wherein an inner space of the inner circular tube is in communication with the upper inlet of the fan, and the air is flown through the outer circular tube, the filter medium and the inner circular tube into the inner space of the inner circular tube;
   a particle filter connected to a lower portion of the fan to remove particles contained in the air blown out by the fan, and
   a second cover disposed between the chemical filter and the fan to surround the upper inlet of the fan, wherein the inner space of the inner circular tube, and an inter-space between the inner and the outer circular tubes are defined by the first and the second covers, wherein the second cover has a circular flat ring shape, an outer diameter of the second cover is substantially larger than that of the outer circular tube, and the chemical filter is connected onto the upper portion of the fan by a plurality of fasteners secured to the upper portion of the fan through edge portions of the second cover.

14. The fan filter unit of claim 13, wherein the chemical filter is coaxially arranged with the fan.

15. The fan filter unit of claim 13, wherein the inner and the outer circular tubes comprise perforated metal sheets, respectively.

16. The fan filter unit of claim 13, wherein the inner and the outer circular tubes comprise metal meshes, respectively.

* * * * *